(12) United States Patent
Deja et al.

(10) Patent No.: US 11,555,414 B2
(45) Date of Patent: Jan. 17, 2023

(54) DEVICE, METHOD AND ASSEMBLY FOR CLEANING THE CORE ENGINE OF A JET ENGINE

(71) Applicant: Lufthansa Technik AG, Hamburg (DE)

(72) Inventors: Dirk Deja, Nauheim (DE); Christian Lutz, Aschaffenburg (DE); Sina Glasse, Mainz (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 0 days.

(21) Appl. No.: 17/265,534

(22) PCT Filed: Aug. 1, 2019

(86) PCT No.: PCT/EP2019/070742
§ 371 (c)(1),
(2) Date: Feb. 3, 2021

(87) PCT Pub. No.: WO2020/030515
PCT Pub. Date: Feb. 13, 2020

(65) Prior Publication Data
US 2021/0317752 A1 Oct. 14, 2021

(30) Foreign Application Priority Data
Aug. 6, 2018 (DE) .................. 10 2018 119 094.8

(51) Int. Cl.
*B08B 3/02* (2006.01)
*F01D 25/00* (2006.01)
*B08B 13/00* (2006.01)

(52) U.S. Cl.
CPC ............ *F01D 25/002* (2013.01); *B08B 3/022* (2013.01); *B08B 3/024* (2013.01); *B08B 13/00* (2013.01); *F05D 2220/323* (2013.01)

(58) Field of Classification Search
None
See application file for complete search history.

(56) References Cited

U.S. PATENT DOCUMENTS

2006/0048796 A1\* 3/2006 Asplund ................... B08B 3/02
134/21
2008/0087301 A1\* 4/2008 Lee .......................... B08B 9/00
134/198

(Continued)

FOREIGN PATENT DOCUMENTS

DE 202004021476 U1 4/2008
DE 102013202616 A1 8/2014

(Continued)

*Primary Examiner* — Mikhail Kornakov
*Assistant Examiner* — Ryan L Coleman
(74) *Attorney, Agent, or Firm* — Leydig, Voit & Mayer, Ltd.

(57) ABSTRACT

A device cleans a core engine of a jet engine. The device has: a nozzle installation which is configured for introducing a cleaning medium into the core engine; a connector configured to connect the device in a rotationally fixed manner to a shaft of a fan of the jet engine; and a line connection configured to supply the cleaning medium, which is connected to the nozzle installation by a rotary coupling. The nozzle installation comprises nozzles, comprising at least one flat jet nozzle, and at least one full cone nozzle or hollow cone nozzle.

11 Claims, 6 Drawing Sheets

(56) References Cited

U.S. PATENT DOCUMENTS

| | | |
|---|---|---|
| 2010/0000572 A1 | 1/2010 | Giljohann et al. |
| 2010/0200023 A1 | 8/2010 | Giljohann et al. |
| 2014/0034091 A1 | 2/2014 | Dorshimer et al. |
| 2015/0122292 A1* | 5/2015 | McDermott .......... F01D 25/002 134/18 |
| 2015/0233263 A1 | 8/2015 | Battaglioli et al. |
| 2018/0135518 A1* | 5/2018 | Moniz .................... F02C 7/141 |

FOREIGN PATENT DOCUMENTS

| | | |
|---|---|---|
| EP | 3189934 A1 | 7/2017 |
| WO | WO 2005077554 A1 | 8/2005 |
| WO | WO 2008113501 A1 | 9/2008 |
| WO | WO 2009132847 A1 | 11/2009 |
| WO | WO 2015079029 A1 | 6/2015 |

* cited by examiner

DEVICE, METHOD AND ASSEMBLY FOR CLEANING THE CORE ENGINE OF A JET ENGINE

CROSS-REFERENCE TO PRIOR APPLICATIONS

This application is a U.S. National Phase Application under 35 U.S.C. § 371 of International Application No. PCT/EP2019/070742, filed on Aug. 1, 2019, and claims benefit to German Patent Application No. DE 10 2018 119 094.8, filed on Aug. 6, 2018. The International Application was published in German on Feb. 13, 2020, as WO 2020/030515 under PCT Article 21(2).

FIELD

The present invention relates to a device and to a method for cleaning the core engine of the jet engine.

The subject matter of the invention furthermore relates to an assembly of such a device and a jet engine.

BACKGROUND

Jet engines of commercial sub-sonic airliners nowadays are largely turbofan jet engines. Such a turbofan jet engine possesses a core engine in which the actual combustion process of the kerosene takes place. The core engine, in the manner known, possesses one or more compressor stages, a combustion chamber, as well as one or more turbine stages in which the hot combustion gases discharge part of their mechanical energy. This mechanical energy is required for driving the compressor stages, on the one hand, and a turbofan which is disposed upstream of the core engine and typically has a significantly larger diameter than the core engine and allows a significant part of the overall air flowing through the engine to flow past the engine as a bypass airflow or a secondary airflow, on the other hand. By way of this bypass air flow, the turbofan generates a significant part of the thrust output of the engine; the high proportion of bypass airflow furthermore ensures a better environmental compatibility of the engine, in particular a better rate of efficiency at sub-sonic speeds, as well as an improved noise abatement of the hot exhaust flow of the core engine.

Jet engines, when in operation, are contaminated by combustion residue of the core engine as well as by air contamination that has been suctioned by the combustion or bypass air, respectively, such as, for example, dust, insects, salt spray, or other environmental contaminations. These contaminations form a layer, in particular also on the rotor blades and/or stator blades of the compressor of the core engine that impedes the surface quality and thus ultimately the thermodynamic efficiency of the engine.

Jet engines are cleaned in order for the contaminations to be removed. For this purpose, it is known from WO 2005/077554 A1 to dispose a plurality of cleaning nozzles upstream of the fan of a turbofan engine so as to clean the fan and the core engine.

WO 2008/113501 discloses a device of the type mentioned at the outset which is placed onto the fan and conjointly rotates during the cleaning operation.

SUMMARY

In an embodiment, the present invention provides a device that cleans a core engine of a jet engine. The device has: a nozzle installation which is configured for introducing a cleaning medium into the core engine; a connector configured to connect the device in a rotationally fixed manner to a shaft of a fan of the jet engine; and a line connection configured to supply the cleaning medium, which is connected to the nozzle installation by a rotary coupling. The nozzle installation comprises nozzles, comprising at least one flat jet nozzle, and at least one full cone nozzle or hollow cone nozzle.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

In an embodiment, the present invention provides a device, a method, and an assembly of the type mentioned at the outset which have a positive cleaning performance.

It is provided according to an embodiment of the invention that the nozzle installation has at least one flat jet nozzle and at least one full cone nozzle or hollow cone nozzle.

Some of the terms used in the context of the invention are first to be explained. The term jet engine refers to any mobile gas turbines for application in the aerospace sector. In the context of embodiments of the invention, the term refers in particular to turbofan engines in which the actual gas turbine forms a so-called core engine, and in which a turbofan which, in terms of the diameter, is larger and generates a bypass airflow about the core engine is disposed upstream of the core engine. The term core engine refers to the actual gas turbine of the jet engine in which the combustion process of the fuel, in particular kerosene, takes place. Such a core engine typically has one or more compressor stages, a combustion chamber, as well as one or more turbine stages which are driven by the hot exhaust gases.

The nozzle installation has a plurality of nozzles for the cleaning medium as well as means for connecting in a rotationally fixed manner this nozzle installation and thus the nozzles to the shaft of the fan of the jet engine, the means yet to be explained in more detail hereunder.

The cleaning medium is supplied to the nozzle installation by means of a line connection and a rotary coupling. The term line connection in the context of the invention is to be widely interpreted and can also comprise the stationary (not conjointly rotating) connector piece on the rotary coupling, for example.

A supply installation provides a cleaning medium (for example in one or a more tanks), and can be provided with operating and drive installations, pumps, power accumulators, or the like. The supply installation is preferably configured as a mobile, in particular drivable, unit.

Cone nozzles have a spray jet which is substantially rotationally symmetrical and has the shape of a hollow cone (hollow cone nozzles) or of a full cone (full cone nozzles). The main exit direction corresponds to the axis of symmetry of the cone.

Flat jet nozzles have a flat spray jet which, in a first spatial direction perpendicular to the main exit direction has a spraying angle or opening angle, respectively, which is substantially larger than in a second spatial direction perpendicular to the main exit direction and to the first spatial direction. The small (acute) opening angle can be, for example, 1° to 5°.

According to the invention, the full cone nozzles are preferable among the cone nozzles.

The invention has recognized that the combination of flat jet nozzles and cone nozzles, in particular full cone nozzles, significantly improves the cleaning performance in the core engine. Flat jet nozzles have the effect of a positive cleaning performance in the front compressor region (situated upstream). Cone nozzles have the effect of improved cleaning in the rear region of the core engine (situated downstream) because the cone nozzles under otherwise identical operating conditions (supply rate and pressure of the cleaning medium) allow a liquid cleaning medium to be atomized more finely and exit more slowly. In this way, the cleaning medium can better follow the flow through the core engine and, as finely distributed droplets, penetrate deeper.

The device according to a preferred embodiment of the invention has in each case at least one, preferably in each case two flat jet nozzles and full cone nozzles. The combination of two flat jet nozzles and two full cone nozzles results in a particularly positive cleaning performance.

In a preferred embodiment, each nozzle has a spraying angle of 20° to 120°, preferably 60° to 90°. The term spraying angle refers to the largest opening angle of the spray cone, or of the spray fan, respectively.

According to one further preferred embodiment of the invention, the main exit direction of each nozzle conjointly with the rotation axis of the device encloses an angle $\alpha$ of −45° to 45°, preferably −5° to 30°. This angle is preferably adapted to the type of engine which, in each case, has to be cleaned. The rotation axis of the device during the cleaning operation corresponds to the rotation axis of the engine. A negative algebraic sign of the angle refers to a main exit direction that, in an outward manner, points away from the rotation axis. A positive algebraic sign of the angle refers to a main exit direction which, in an inward manner, points toward the rotation axis, this being typically preferable.

A further subject of the matter relates to a method for cleaning the core engine of a jet engine by means of a device according to the invention. In this method, the exit openings of the nozzles have a spacing of 1 to 25 cm, preferably 4 to 15 cm, from the entry plane of the inlet guide vanes of the core engine.

The invention has recognized that the choice of this spacing can significantly contribute toward the spray jet reaching the desired degree of distribution, or the desired droplet size, respectively, already prior to entering the core engine, such that the complete width and height of the entry opening, or of the inlet guide vanes of the core engine, respectively, can be swept, on the one hand, and the entry takes place by way of the desired degree of distribution, or degree of fragmentation, respectively, on the other hand, so that the desired cleaning effect is obtained.

In the context of the method, the combination of this spacing range with the preferred ranges of the angle $\alpha$ that have been defined above in the context of the device is particularly advantageous. In this context, it is preferable for the spacing of the nozzles from the entry plane of the inlet guide vanes to be selected within the mentioned range such that the inlet guide vanes are covered across the full area at the provided opening angle (spraying angle) $\alpha$. The central axis of the spray cone herein is preferably aligned toward the inlet guide vanes in a substantially centric manner.

According to one further preferred embodiment of the method according to the invention, the main exit direction of each nozzle conjointly with the profile chord of the inlet guide vanes of the core engine encloses an angle $\beta$ of −75° to 75°, preferably −35° to 35°. This adaptation of the main exit direction relative to the profile chord of the inlet guide vanes permits the spray mist to better pass through the front region, or the front compressor stages, respectively, of the core engine.

Instead of being defined in terms of the profile chord, a corresponding angle can alternatively be defined in terms of the rotation axis. For example, in the engine type CF6-50, an angle $\beta$ of −27° in terms of the profile chord is preferable; this corresponds to an angle of 0° in terms of the rotation axis.

It is preferable according to an embodiment of the invention for the liquid cleaning medium to exit the nozzles by way of a mean droplet size of 10 to 500 µm.

According to one variant of the invention, a liquid cleaning medium is supplied to the nozzles at a pressure of 0.5 to 100 bar, preferably 30 to 80 bar.

The throughput of a liquid cleaning medium per nozzle can be 1 to 200 l/min, preferably 3 to 20 l/min.

The jet engine can be allowed to rotate at a fan rotation speed of 50 to 500 $min^{-1}$, preferably 100 to 300 $min^{-1}$, furthermore preferably 120 to 250 $min^{-1}$, during the cleaning.

A dispersion of a liquid (preferably water) in a gaseous medium (preferably air) is preferably used as a cleaning medium. This dispersion can already be produced before the nozzle exit opening, for example by adding a gaseous medium such as, for example, air to a cleaning liquid. It is however preferable for only a liquid cleaning medium to be guided up to the nozzle exit opening and to be atomized under pressure by exiting at the nozzle exit opening such that the mixture is composed of a liquid and a gaseous medium. This dispersion or this aerosol is than carried through the core engine. The cleaning medium (or the liquid proportion of the aerosol, respectively) is preferably temperature-controlled to a range from 20 to 100° C., furthermore preferably 30 to 80° C., furthermore preferably 50 to 70° C.

A further subject matter of the invention relates to an assembly of a jet engine and a device according to the invention attached thereto for performing cleaning of the core engine, the assembly having the following features:

a. the nozzle installation is connected in a rotationally fixed manner to the shaft of the fan of the jet engine;

b. the rotation axes of the fan of the jet engine and of the nozzle installation are disposed so as to be substantially concentric;

c. the exit openings of the nozzles in the axial direction are disposed behind the plane of the fan, and/or the nozzles are disposed in intermediate spaces of the fan blades or aligned toward intermediate spaces of the fan blades such that the nozzle jets can pass through the plane of the fan in a substantially unimpeded manner;

characterized in that the exit openings of the nozzles have a spacing of 1 to 25 cm, preferably 4 to 15 cm, from the entry plane of the inlet guide vanes of the core engine.

The main exit direction of each nozzle conjointly with the profile chord of the inlet guide vanes of the core engine preferably encloses an angle β of −75° to 75°, preferably −15° to 15°.

The exit openings of the nozzles of the nozzle installation are preferably disposed at a radial spacing from the rotation axis of the engine that corresponds to 0.6 to 1.2 times, preferably 0.6 to 1 times, the radius of the upstream-directed entry opening of the first compressor stage.

Further advantageous embodiments of the device and assembly according to the invention will be disclosed hereunder, the exemplary embodiments offering particular advantages in terms of handling and operation.

The nozzle installation preferably has first contact faces for bearing axially on the fan blades. When placing the nozzle installation onto the spinner of the jet engine, these defined first contact faces form a detent which positions in a defined manner the nozzle installation relative to the jet engine at least in the axial direction. When being placed thereon, these first contact faces come to bear on fan blades in the axial direction and thus stop the placement movement. The nozzle installation is subsequently fastened to the fan blades, as is explained in more detail hereunder; the means for connecting in a rotationally fixed manner herein apply forces (tensile forces) acting in the axial direction in such a manner that the defined axial positioning in the cleaning operation is maintained on account of contact on the fan blades.

The first contact faces are preferably configured so as to be cushioned and/or elastic, for example as rubber buffers. These are a plurality of contact faces, preferably three or more contact faces, which are preferably distributed across the circumference at uniform angular spacings. The extent of the contact faces in the radial direction as well as the circumferential direction is preferably sufficient so as to cause secure positioning and absorption of forces of the nozzle installation placed thereon.

This aspect of the invention has recognized that the positioning of the nozzle installation in the prior art according to WO 2008/113501 A1 only by contacting or bearing, respectively, on the spinner typically leads to the nozzle installation being positioned in a non-defined and/or eccentric manner relative to the jet engine. This causes an unbalance and/or high wear on the rotary coupling in the cleaning operation. In contrast, the axial contact, on the fan blades, provided according to the invention permits defined positioning which ensures that the axis of the nozzle installation (and thus of the rotary coupling) always runs in the same direction as the axis of the jet engine.

The first contact faces are preferably disposed on a first annular region of the nozzle installation. This annular region can preferably be configured as a closed ring which is disposed on the end region of the nozzle installation that, in the placed state, points downstream. According to the invention, the face of this annular region that, in the axial direction, points downstream can be configured as a (cushioned) first contact face across the entire circumference or across sub-segments of the circumference.

In the assembly according to the invention, the internal diameter of the first annular region is preferably identical to or slightly larger than the external diameter of the spinner (the external diameter in the axial plane in which the front edges of the fan blades lie). This contributes towards precisely positioning the nozzle installation not only axially but also radially in relation to the jet engine. Slightly larger in this context means that the first annular region in relation to the jet engine in the placed state has radial play only such that the desired centric fit, if at all, is only slightly compromised.

In one advantageous embodiment, the nozzle installation additionally has second contact faces for bearing on the spinner of the jet engine. The second contact faces can be disposed on a second annular region of the nozzle installation, for example, that in the axial direction is disposed between the first annular region and the rotary coupling. These second contact faces can likewise be elastic/cushioned. The second contact faces can preferably contribute toward centering the nozzle installation placed on the jet engine in a radial plane between the upstream-facing tip of the spinner and the front edge of the fan blades.

Overall, the first and the second contact faces conjointly can thus be configured for centering the device on the spinner of the jet engine.

In the device according to the invention in the placed state, as well as in the assembly according to the invention, the distribution of mass of the nozzle installation is preferably rotationally symmetrical about the rotation axis of the latter.

In one preferred embodiment of the invention, the means for connecting in a rotationally fixed manner to the shaft of the fan of the jet engine comprise at least two, preferably three or more tensioning ropes and fastening means for fastening the tensioning ropes to the fan blades. The fastening means are configured as individual fastening means that can be separately locked. The distribution of the fastening means and/or tensioning ropes in the circumferential direction can correspond to the respective distribution of the first contact faces, or in the circumferential direction can be disposed between such contact faces.

The tensioning ropes are preferably able to be fastened to the fan blades, preferably to the rear edge of the latter (by means of hooks or clamping jaws). These hooks or clamping jaws, respectively, can have a sufficiently soft plastics-material or rubber coating or casing.

The design embodiment according to the invention of the fastening means as separately lockable individual fastening means has substantial advantages in comparison to the central clamping device disclosed in WO 2008/113501 A1. In this prior art, the tensioning ropes have to be deflected and guided up to the rotary coupling in a complicated manner; a central clamping ring by way of which all tensioning ropes are simultaneously tensioned and a comparatively imprecise positioning of the nozzle installation is thus caused is provided in the prior art.

The contact faces provided according to the invention and the positioning of the nozzle installation caused on account thereof permit individual fastening means which are substantially easier to handle and which can be fastened and locked in a sequential manner to be provided, because the positioning is already insured on account of the contact faces. The individual fastening moreover permits short tensioning ropes and thus a simple and robust clamping system.

The individual fastening means preferably have bell crank levers for locking and tensioning the tensioning ropes. In the case of a bell crank lever, the transmission ratio between the applied force and the resultant force, or between the primary throw and the secondary throw, respectively, varies continuously during the activation. During the activation to the closed (locked) state, the throw rate (exerted on the tensioning rope) is reduced at a constant activation rate, while, in contrast, the tensile force exerted on the tensioning rope is increased.

This design embodiment according to the invention of the individual fastening means permits the nozzle installation to be fastened to a jet engine in a simple, secure and defined manner without the aid of tools.

The individual fastening means preferably have spring elements for setting a predefined preload of the tensioning ropes in order for the nozzle installation to be compressed by way of a defined force.

It can be provided according to the invention that the individual fastening means, for securing in the closed state, have a securing installation. For example, the bell crank lever, in the closed state, can be locked with a split pin or a safety pin.

It can be provided according to the invention that the rotary coupling has an impact protection. This can be, for example, a cushion (configured as a plastics-material ring, for example) which in particular points in the radial direction and protects the rotary coupling from impacts in particular when being placed.

Figure 1:
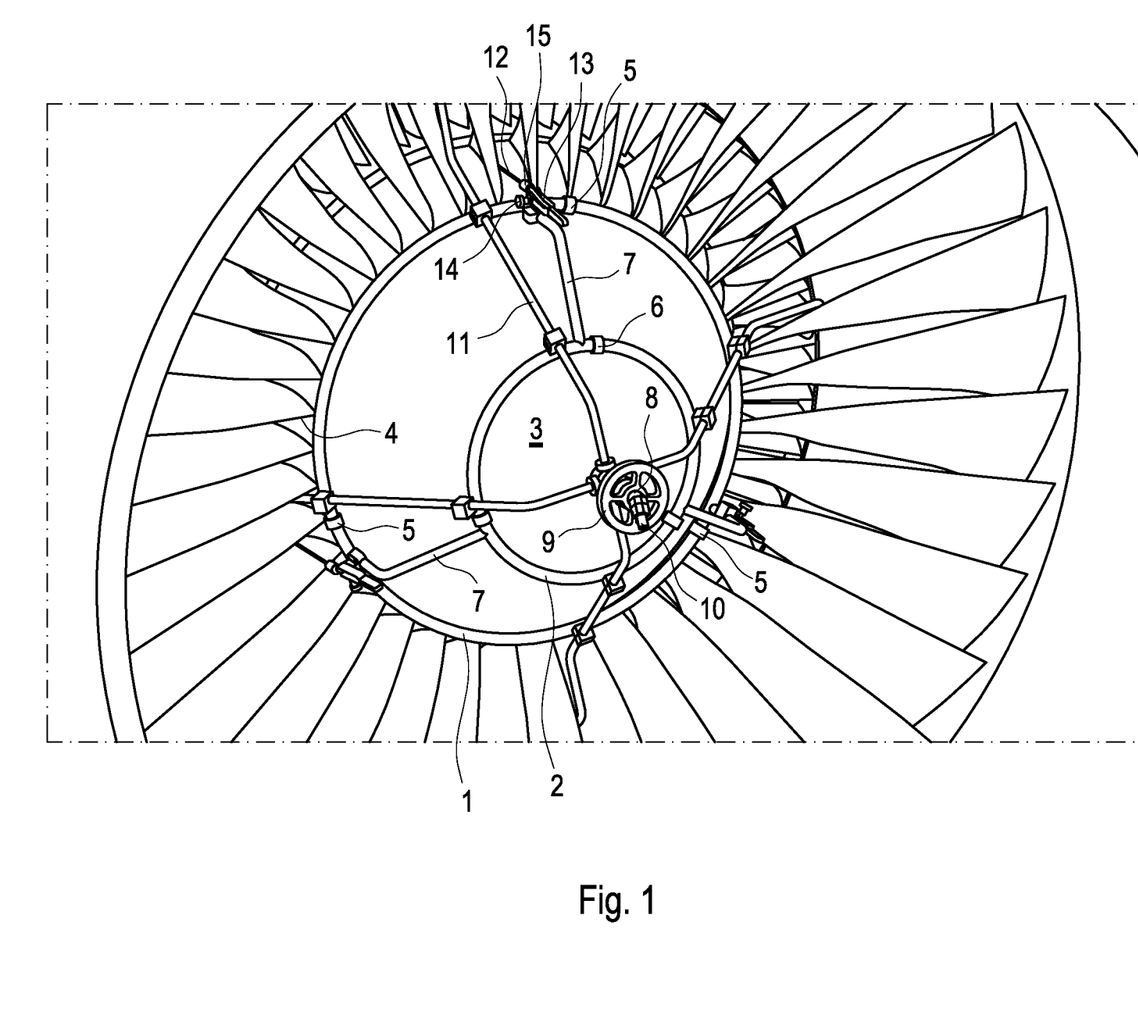
FIG. 1 schematically shows a view of a device according to an embodiment of the invention that is assembled on a jet engine.
Figure 2:
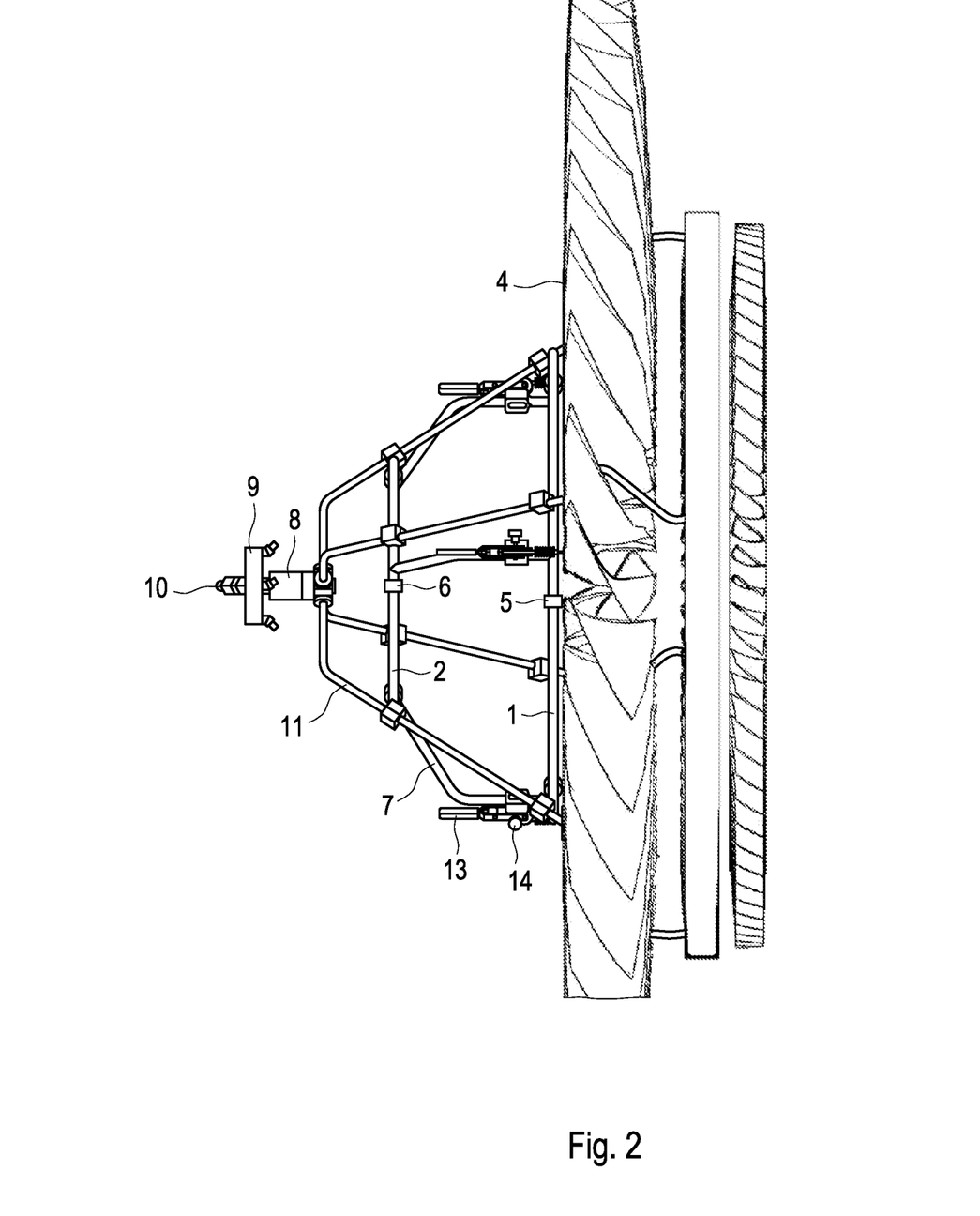
FIG. 2 schematically shows an axial section through the engine having a device according to an embodiment of the invention placed thereon.

In FIG. 1, the nozzle installation has two annular regions or annular elements 1, 2, respectively, with the aid of which the nozzle installation is placed onto a shaft hub, or a spinner 3, respectively, of the fan of a jet engine. In the placed state, the annular elements 1, 2 enclose the spinner 3 in a substantially form-fitting manner. The internal diameter of the annular element 1 which, in axial terms, is disposed downstream is slightly larger than the external diameter of the spinner 3 in the axial plane in which the front edges of the fan blades 3 lie.

Rubber buffers 5 that are distributed across the circumference of the first annular element 1 form first contact faces by way of which the annular element 1 bears axially on the front edge of the fan blades 4.

Rubber buffers 6 that are distributed across the circumference of the second annular element 2 form second contact faces by way of which the annular element 2 bears on the spinner 3.

The two annular elements 1, 2 are connected to one another by radial stays 7. A rotary coupling which, in its entirety, is identified by the reference sign 8 and has an impact protection 9 as well as a connector piece 10 of a line connection is disposed on the tip of the nozzle installation that points upstream (in terms of the flow direction of the engine).

Four pressure lines 11 which feed a cleaning medium to four nozzles extend from this rotary coupling. The pressure lines 11 are fixed to the annular elements 1, 2 at the intersection points with these annular elements and thus form part of the support structure of the entire nozzle installation.

Tensioning ropes 12 which, by means of hooks, can be hooked onto the rear edges of the fan blades 4 are provided for fastening the nozzle installation to the fan. Bell crank levers 13 which, in the locked position, can be fixed by means of a safety pin 14 are provided as individual fastening means for fixing the tensioning ropes 12. A spring 15 ensures defined tensioning of the tensioning ropes 12.

For cleaning the core engine, the nozzle installation, in the manner that can in particular be derived from FIG. 1, is placed onto the fan and fixed to the fan blades by means of the tensioning ropes 12. The engine is set in rotation (dry cranking). The nozzles are fed with a cleaning medium from a supply installation by way of the connection line 10, the rotary coupling 8, and the pressure lines 11.

This cleaning medium sweeps the inlet of the core engine across the entire circumference of the latter and thus performs the cleaning.

Figure 3:
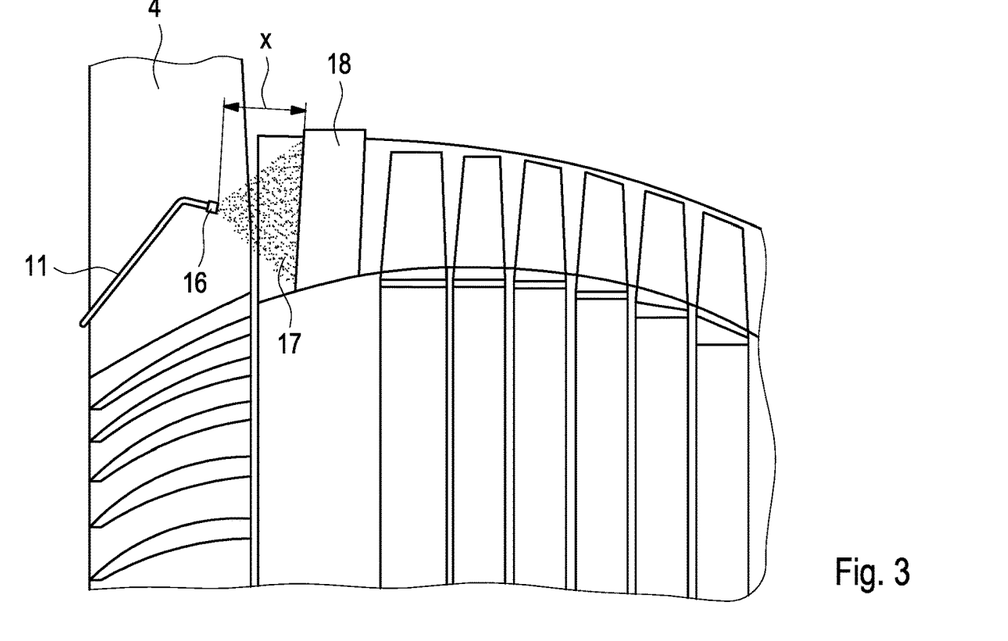
FIG. 3 schematically shows the assembly of a nozzle and the spacing thereof relative to the inlet guide vanes.

FIG. 3 schematically shows a pressure line 11 and the full cone nozzle 16 which is disposed on the end of the pressure line 11 and between the fan blades 4, as well as the spray cone 17 of the full cone nozzle 16. The axial spacing of the exit opening of the nozzle 16 from the entry plane of the inlet guide valves 18 of the core engine is schematically identified by the reference sign X.

Figure 4:
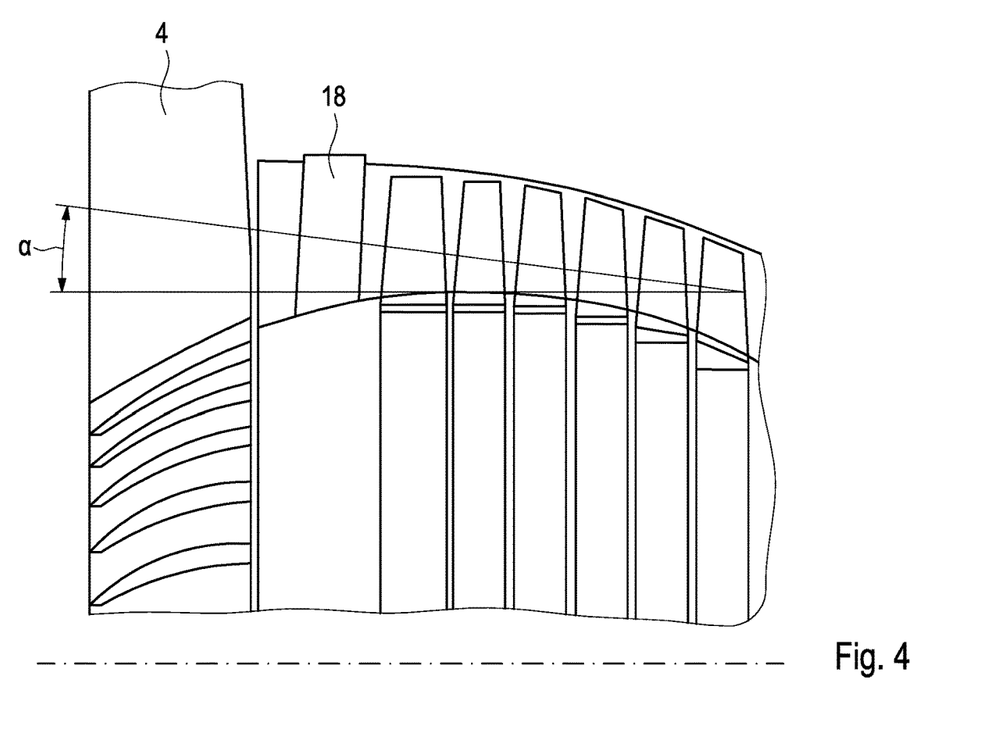
FIG. 4 schematically shows the determination of the angle $\alpha$ between the rotation axis and the main exit direction of a nozzle.

FIG. 4 schematically shows an angle $\alpha$ between the main exit direction of a nozzle and an axis that is parallel to the rotation axis. In this variant of the embodiment, the angle $\alpha$ approximates the angle between the rotation axis of the engine and a second straight line which as a tangent runs on the radially outward periphery of the intake of the compressor of the core engine and on the convex curvature of the flow duct that, in the flow direction, is disposed therebehind.

Figure 5:
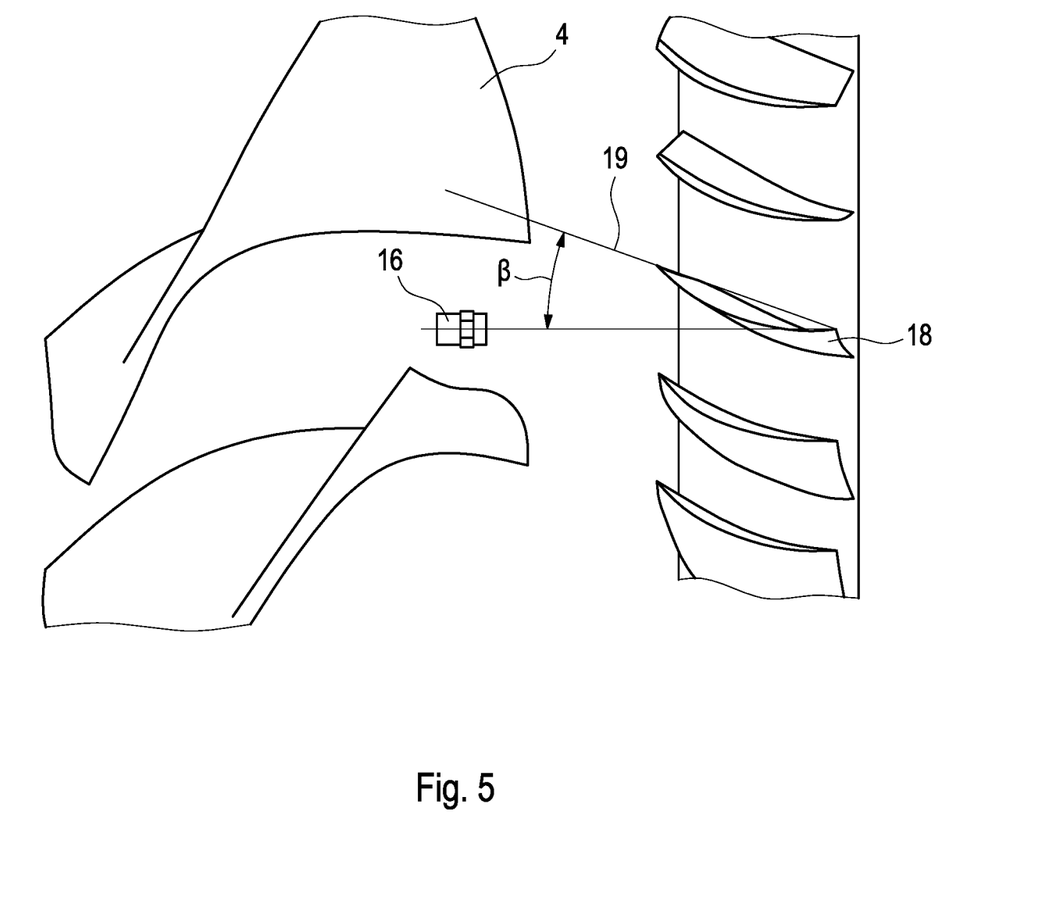
FIG. 5 schematically shows the determination of the angle $\beta$ between the profile chord of the inlet guide vanes of the core engine and the main exit direction of a nozzle.
Figure 6:
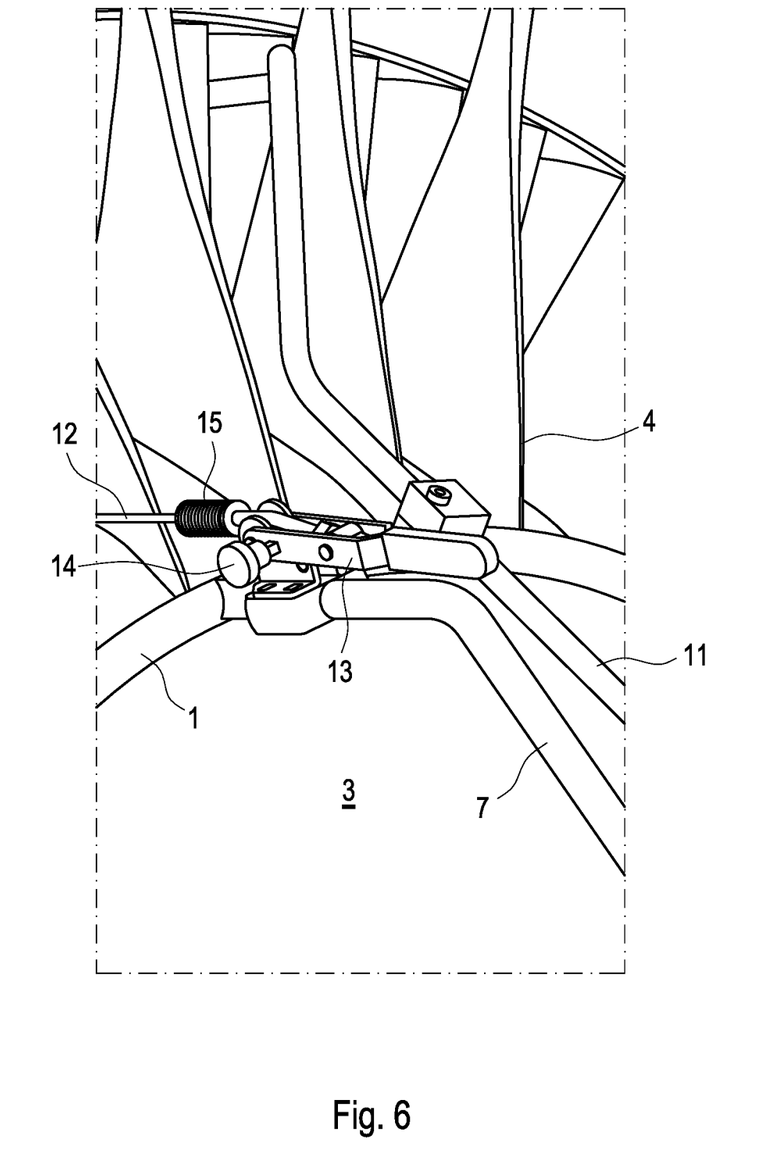
FIG. 6 shows the fastening by means of a bell crank lever in a detailed view.
Figure 7:
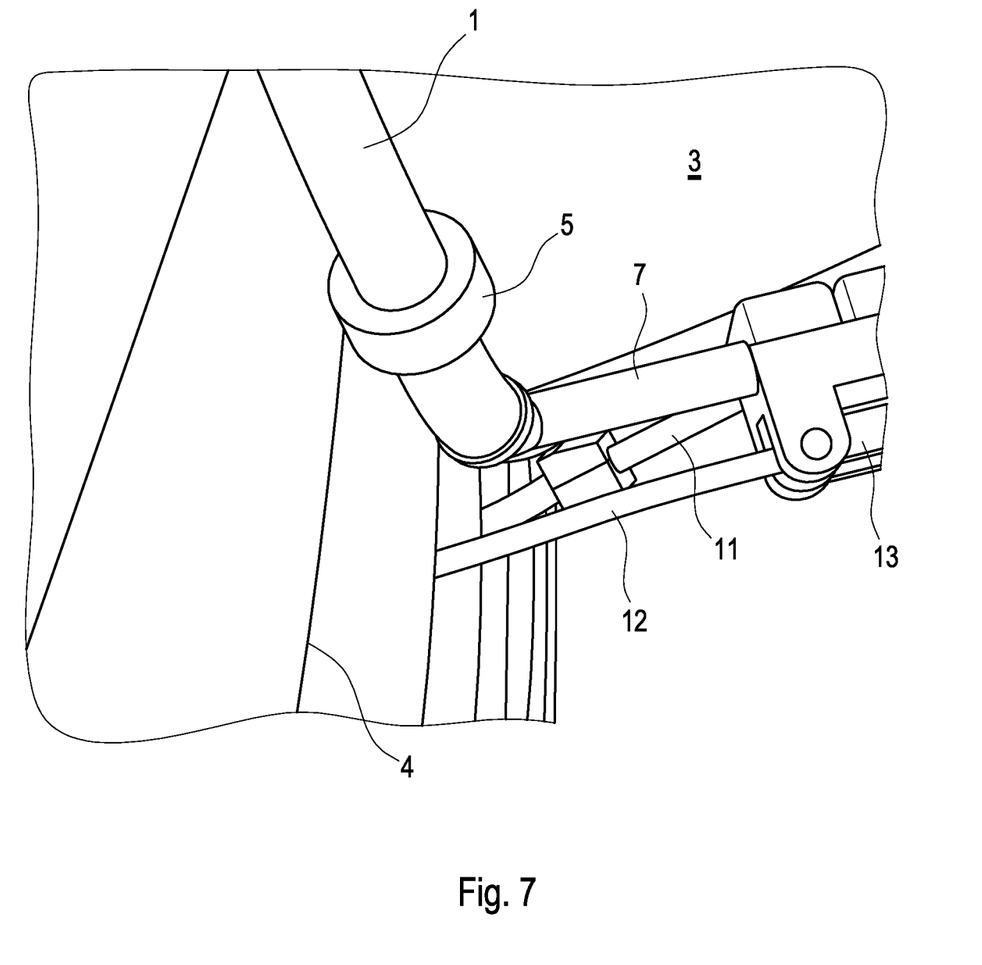
FIG. 7 shows the design embodiment of the first contact faces in a detailed view.

FIG. 5 schematically shows an angle $\beta$ between the main exit direction of a nozzle 16 and the profile chord 19 (or the imaginary extension thereof, respectively) of the inlet guide vanes 18 of the core engine.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A device for cleaning a core engine of a jet engine, the device comprising:
   a nozzle installation which is configured for introducing a cleaning medium into the core engine;

means for connecting in a rotationally fixed manner to a shaft of a fan of the jet engine; and a line connection configured to supply the cleaning medium, which is connected to the nozzle installation by a rotary coupling, wherein the nozzle installation comprises nozzles, each of the nozzles having a spraying angle of 60° to 90°, the nozzles comprising at least one flat jet nozzle, and at least one full cone nozzle or hollow cone nozzle, and wherein the nozzles of the nozzle installation are oriented such that, when the device is connected to said shaft using the means for connecting, a main exit direction of each of the nozzles conjointly with a rotation axis of the device encloses an angle $\alpha$ of −5° to 30°.

2. The device as claimed in claim 1, wherein the device comprises the at least one flat jet nozzle and the at least one full cone nozzle.

3. An assembly comprising the jet engine and the device as claimed in claim 1 attached to the jet engine for performing cleaning of the core engine, wherein:
 a. the nozzle installation is connected in the rotationally fixed manner to the shaft of the fan of the jet engine;
 b. a rotation axis of the fan of the jet engine and the rotation axis of the nozzle installation are disposed so as to be substantially concentric;
 c. exit openings of the nozzles in an axial direction are disposed behind a plane of the fan, or the nozzles are disposed in intermediate spaces of fan blades or aligned toward the intermediate spaces of the fan blades such that nozzle jets are configured to pass through the plane of the fan in a substantially unimpeded manner; and
 d. the exit openings of the nozzles have a spacing of 1 to 25 cm from an entry plane of inlet guide vanes of the core engine.

4. The assembly as claimed in claim 3, wherein a main exit direction of each of the nozzles conjointly with a profile chord of the inlet guide vanes of the core engine encloses an angle $\beta$ of −75° to 75°.

5. The assembly as claimed in claim 3, wherein the exit openings of the nozzles of the nozzle installation are disposed at a radial spacing from the rotation axis of the jet engine that corresponds to 0.6 to 1.2 times a radius of an upstream-directed entry opening of a first compressor stage.

6. A method for cleaning a first core engine of a first jet engine with the device as claimed in claim 1, wherein exit openings of the nozzles have a spacing of 1 to 25 cm from an entry plane of inlet guide vanes of the first core engine while the cleaning medium is ejected from the nozzles.

7. The method as claimed in claim 6, wherein a main exit direction of each of the nozzles conjointly with a profile chord of inlet guide vanes of the first core engine encloses an angle $\beta$ of −75° to 75°.

8. The method as claimed in claim 6, wherein the cleaning medium comprises a liquid cleaning medium, the method comprising introducing the liquid cleaning medium into the first core engine with the liquid cleaning medium exiting the nozzles with a mean droplet size of 10 to 500 µm.

9. The method as claimed in claim 7, the method comprising supplying the liquid cleaning medium to the nozzles at a pressure of 0.5 to 100 bar.

10. The method as claimed in claim 6, wherein a throughput of the liquid cleaning medium per each of the nozzles is 1 to 200 l/min or the first jet engine is allowed to rotate at a fan rotation speed of 50 to 500 $\text{min}^{-1}$.

11. The method as claimed in claim 6, wherein a dispersion of a liquid in a gaseous medium is used as the cleaning medium.

\* \* \* \* \*